(12) United States Patent
Kachline

(10) Patent No.: US 8,772,673 B2
(45) Date of Patent: Jul. 8, 2014

(54) WELDING GUN

(71) Applicant: Lincoln Global, Inc., City of Industry, CA (US)

(72) Inventor: Jeffrey Kachline, Highland Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/834,449

(22) Filed: Mar. 15, 2013

(65) Prior Publication Data

US 2013/0270247 A1 Oct. 17, 2013

Related U.S. Application Data

(63) Continuation of application No. 11/623,521, filed on Jan. 16, 2007, now Pat. No. 8,426,774.

(60) Provisional application No. 60/759,057, filed on Jan. 17, 2006.

(51) Int. Cl.
*B23K 9/16* (2006.01)

(52) U.S. Cl.
USPC ..................................... 219/137.42

(58) Field of Classification Search
USPC .......... 219/74, 137.61, 137.42, 137.31, 121.5
See application file for complete search history.

(56) References Cited

U.S. PATENT DOCUMENTS 4,529,863 A * 7/1985 Lebel ....................... 219/137.42

\* cited by examiner

*Primary Examiner* — Brian Jennison
(74) *Attorney, Agent, or Firm* — Perkins Coie LLP

(57) ABSTRACT

A welding gun, including a contact tip assembly, a diffuser cap, a tip holder, and a shielding gas diffuser, where the shielding gas diffuser includes a casing and an axial tube extending within the casing, and where the casing and the tip holder are connected via a connection system that includes threads with reduced peaks.

20 Claims, 20 Drawing Sheets

SECTION A-A

SECTION A-A

SECTION A-A

SECTION B-B

WELDING GUN

CROSS-REFERENCE TO RELATED APPLICATION

This application is a Continuation claiming priority to U.S. application Ser. No. 11/623,521, filed Jan. 16, 2007 which is based upon and claims the benefit of priority from U.S. Provisional Application 60/759,057 filed on Jan. 17, 2006 in the United States Patent and Trademark Office, the disclosure of which is incorporated herein by reference in its entirety.

BACKGROUND OF THE INVENTION

1. Field of the Invention

Devices, systems, and methods consistent with the invention relate to a shielding gas diffuser, and a welding gun.

2. Description of the Related Art

A welding gun is utilized to perform electric arc welding. In the related art, a welding gun includes a welding torch at its front end, and an elongated flexible conduit at its rear end. An elongated flexible conduit directs welding wire and shielding gas from a wire feeder to the welding torch. The welding torch includes a contact tip, a diffuser, a nozzle, and a gooseneck.

In use, the welding wire is directed through the gooseneck, diffuser, and contact tip to be welded on a work-piece. Shielding gas is directed through the gooseneck and is immediately diffused by orifices in the diffuser into a chamber defined by the nozzle around the contact tip, so that the shielding gas forms a protective layer between the molten metal of the welding operation and the surrounding atmosphere.

However, this arrangement is deficient in several respects. First, during welding operations, spatter is created, especially during short circuit conditions. This spatter can cause substantial deterioration of the contact tip and diffuser over time. Second, tremendous arc temperatures are created during welding operations, and are thermally transferred through the arc tip into the diffuser and gooseneck. These high temperatures also can cause substantial deterioration and/or deformation of the tip, diffuser, and gooseneck, and can even cause the tip to fuse to the diffuser in some cases. Such fusing destroys the diffuser, which is a relatively expensive component of the welding gun.

The above problems demand an improvement in the related art system.

BRIEF SUMMARY OF THE INVENTION

In one aspect of the invention, there is provided a welding gun that overcomes the problems of the related art.

In another aspect of the invention, there is provided a shielding gas diffuser, including a casing and an axial tube extending within the casing.

In another aspect of the invention, there is provided a shielding gas diffuser, including a casing and axial tubes extending within the casing.

In another aspect of the invention, there is provided a shielding gas diffuser, including a casing and a connection system for a tip holder on a radially inner surface of the casing.

In another aspect of the invention, there is provided a shielding gas diffuser, including a casing and a means for transporting shielding gas axially within the casing.

In another aspect of the invention, there is provided a shielding gas diffuser, including a casing and a means for connecting a tip holder on a radially inner surface of the casing.

In another aspect of the invention, there is provided a welding gun including a shielding gas diffuser, the shielding gas diffuser including a casing and an axial tube extending within the casing.

In another aspect of the invention, there is provided a welding gun including a shielding gas diffuser, the shielding gas diffuser including a casing and a connection system for a tip holder on a radially inner surface of the casing.

The above stated aspects, as well as other aspects, features and advantages of the invention will become clear to those skilled in the art upon review of the following description.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
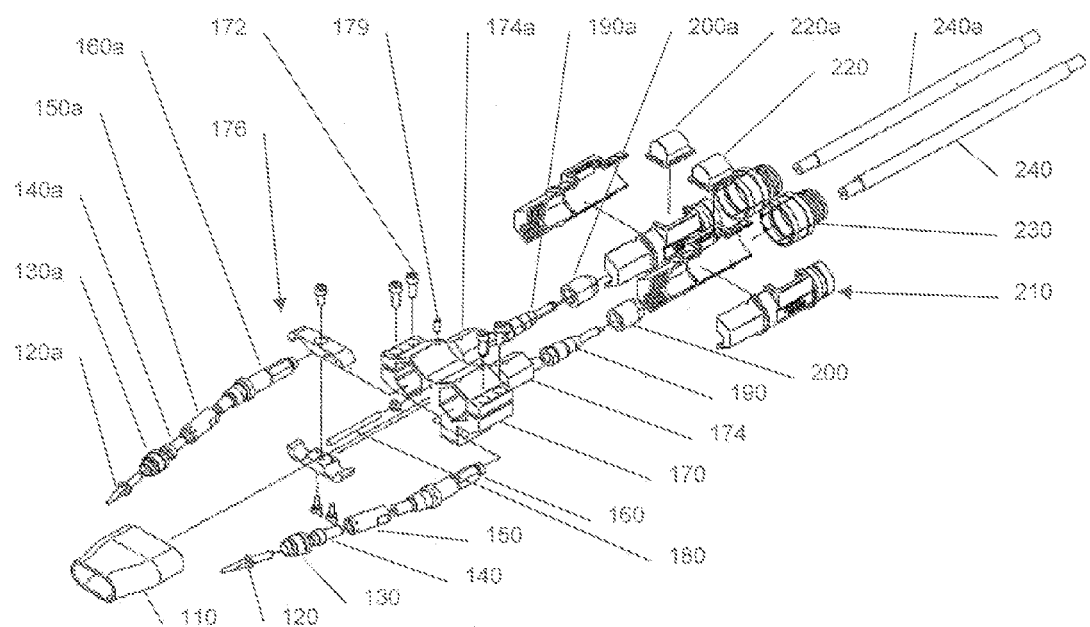
FIG. 1 illustrates an exploded view of a welding gun according to an exemplary embodiment of the invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

An exemplary embodiment of the invention is shown in FIG. 1. In this exemplary embodiment, welding gun 100 is an air-cooled, tandem (i.e., having two contact tips), welding gun. But, the invention described herein is broadly applicable to many other types of welding guns, such as water-cooled welding guns, and welding guns with any number of contact tips, including only a single contact tip.

In the exemplary embodiment of FIG. 1, welding gun 100 includes nozzle 110, contact tip assembly 120 (120a), diffuser cap 130 (130a), which is also known as a "spatter guard," tip holder 140 (140a), diffuser 150 (150a), gooseneck 160 (160a), handle clamp 170, cable connector block 174 (174a), gooseneck clamp 178, rod 180, power cable male cone 190 (190a), power cable female nut 200 (200a), handle 210 (210a), handle cap 220 (220a), handle end cap 230 (230a) and conduit 240 (240a).

Figure 2:
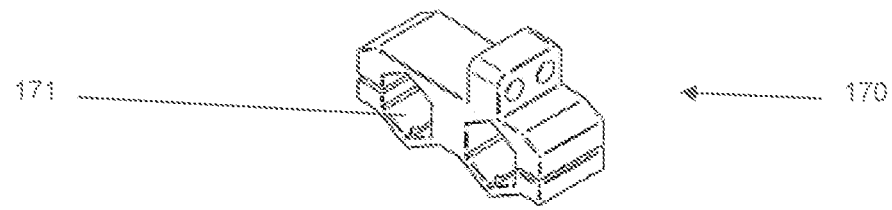
FIG. 2 illustrates an isometric view of a handle clamp of the exemplary embodiment of the welding gun of the invention.
Figure 3:
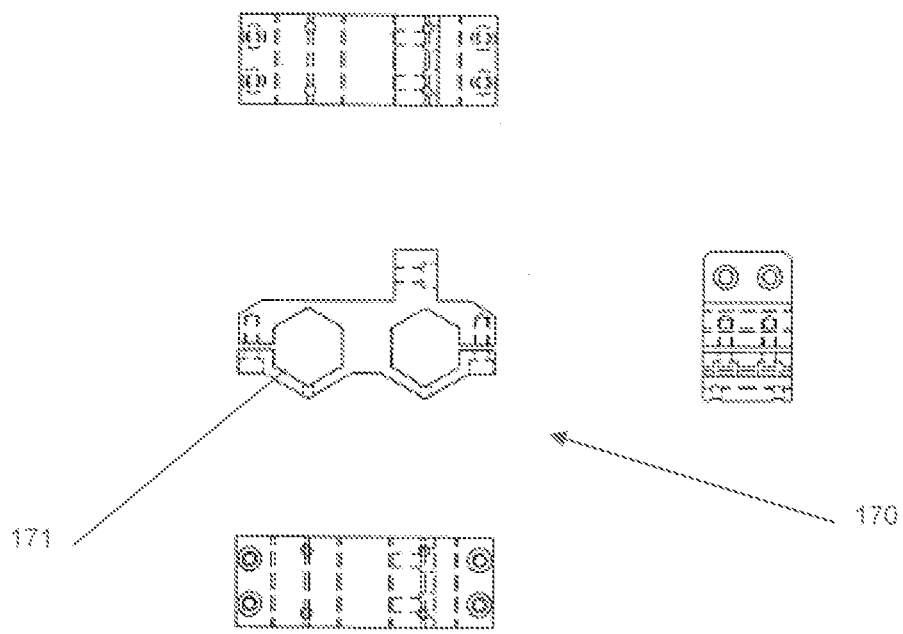
FIG. 3 illustrates front, side, top and bottom views of the handle clamp of the exemplary embodiment of the welding gun of the invention.
Figure 4:
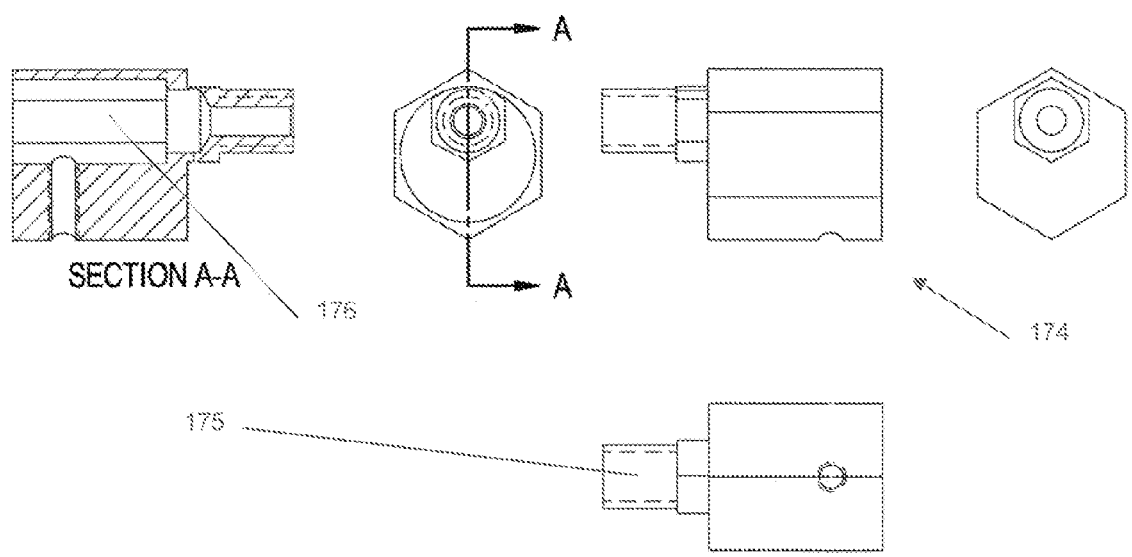
FIG. 4 illustrates front, side, rear, and sectional views of a cable connector block of the exemplary embodiment of the welding gun of the invention.
Figure 5:
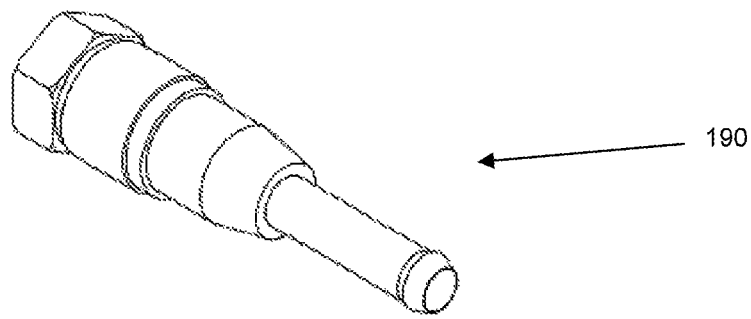
FIG. 5 illustrates an isometric view of a power cable male cone of the exemplary embodiment of the welding gun of the invention.
Figure 6:
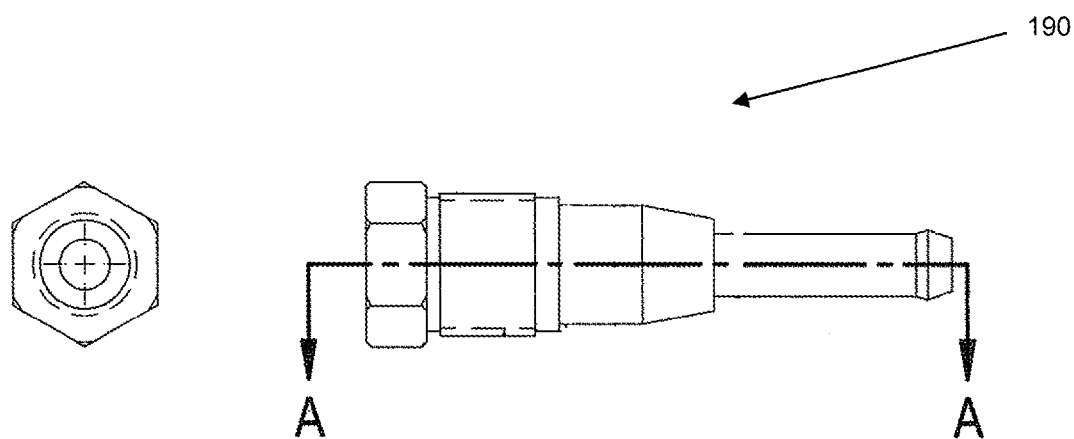
FIG. 6 illustrates front, top, and sectional views of the power cable male cone of the exemplary embodiment of the welding gun of the invention.
Figure 6:
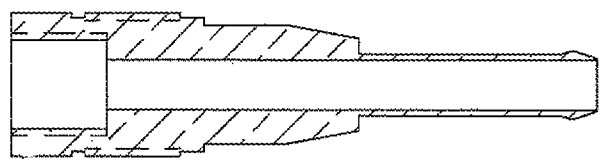
Figure 7:
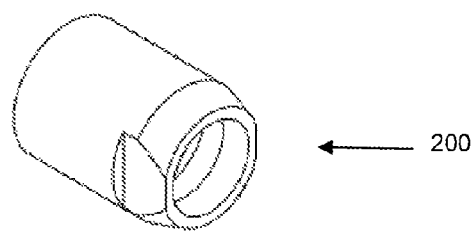
FIG. 7 illustrates an isometric view of a power cable female nut of the exemplary embodiment of the welding gun of the invention.
Figure 8:
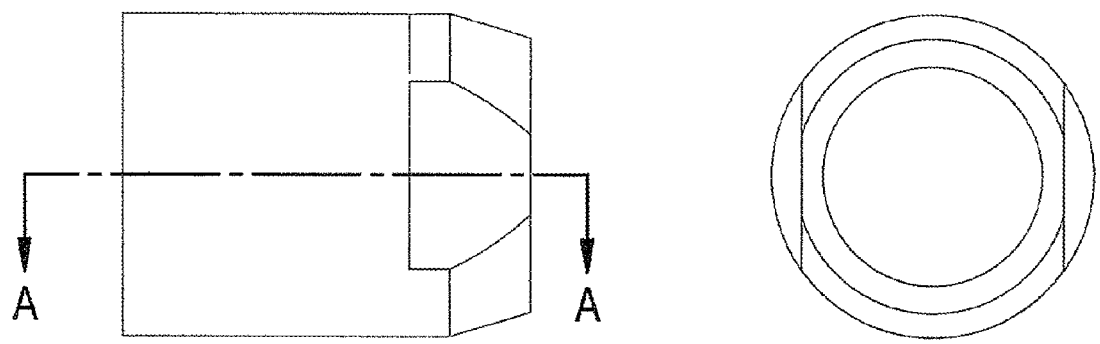
FIG. 8 illustrates front, side, and sectional views of the power cable female nut of the exemplary embodiment of the welding gun of the invention.
Figure 8:
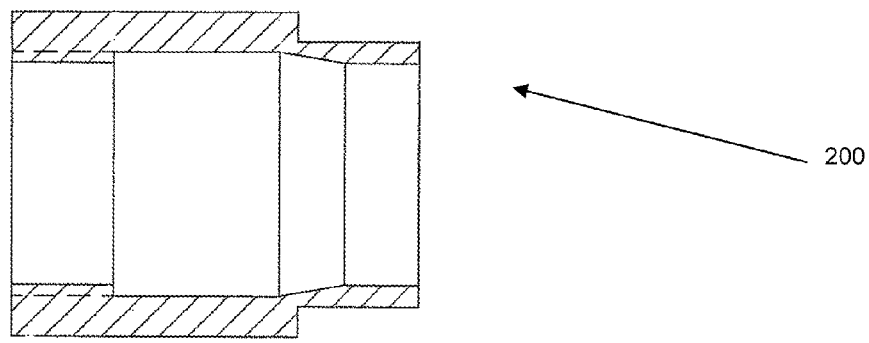
Figure 9:
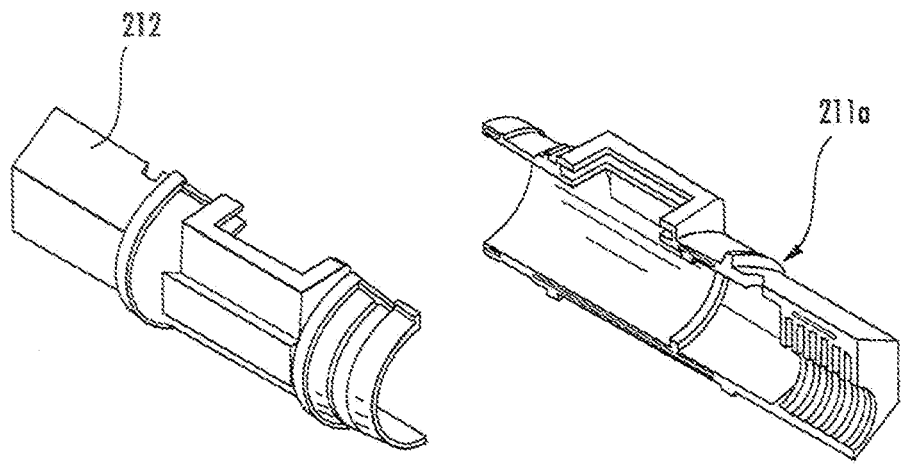
FIG. 9 illustrates an isometric view of a left side handle of the exemplary embodiment of the welding gun of the invention.
Figure 10:
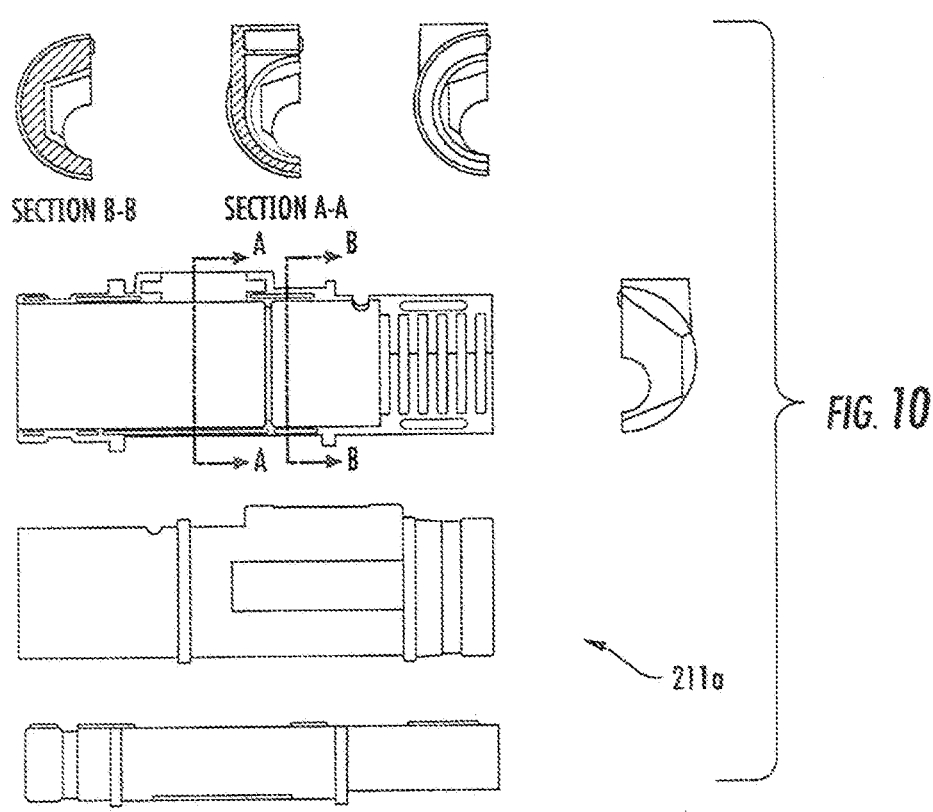
FIG. 10 illustrates front, side, top, bottom, and sectional views of the left side handle of the exemplary embodiment of the welding gun of the invention.
Figure 11:
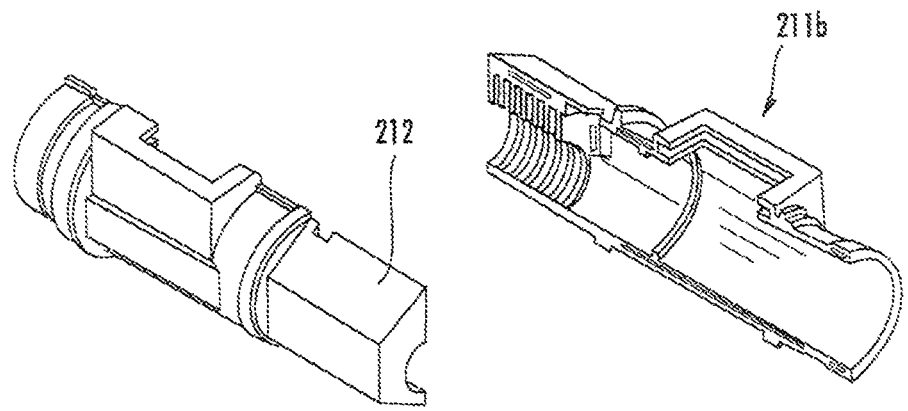
FIG. 11 illustrates an isometric view of a right side handle of the exemplary embodiment of the welding gun of the invention.
Figure 12:
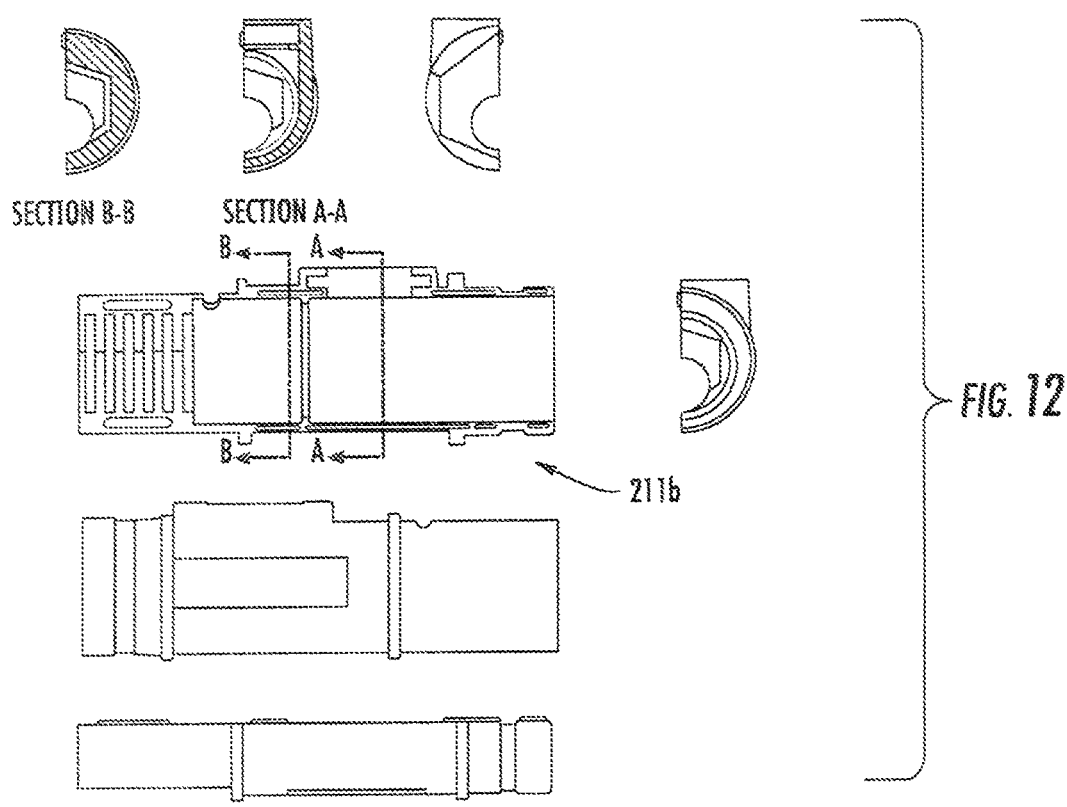
FIG. 12 illustrates front, side, top, bottom, and sectional views of the right side handle of the exemplary embodiment of the welding gun of the invention.
Figure 13:
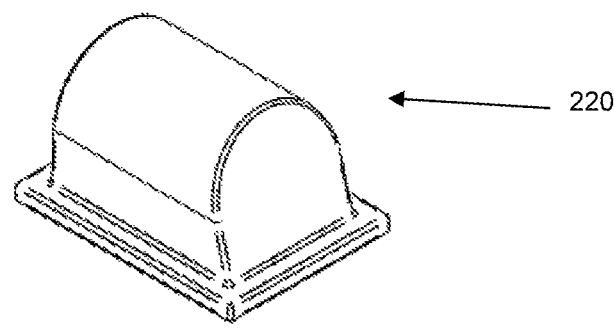
FIG. 13 illustrates an isometric view of a handle cap of the exemplary embodiment of the welding gun of the invention.
Figure 14:
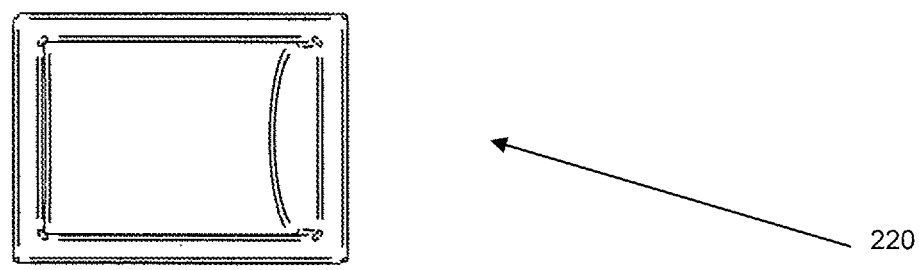
FIG. 14 illustrates top, side, and sectional views of the handle cap of the exemplary embodiment of the welding gun of the invention.
Figure 14:
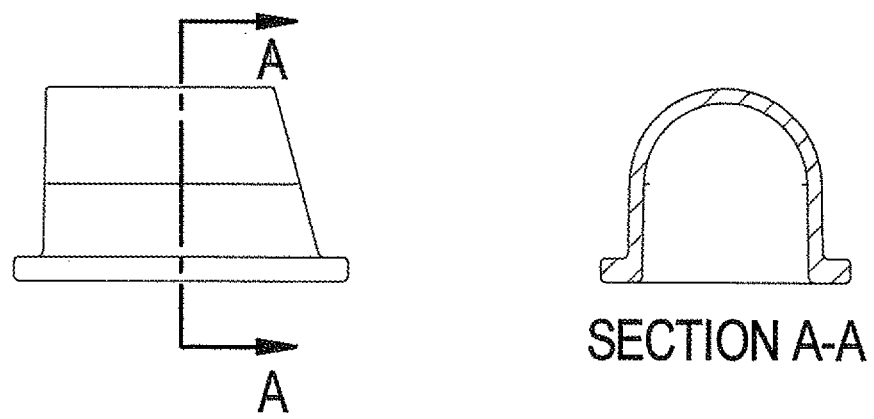
Figure 15:
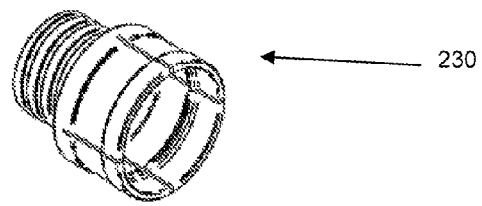
FIG. 15 illustrates an isometric view of a handle end cap of the exemplary embodiment of the welding gun of the invention.
Figure 16:
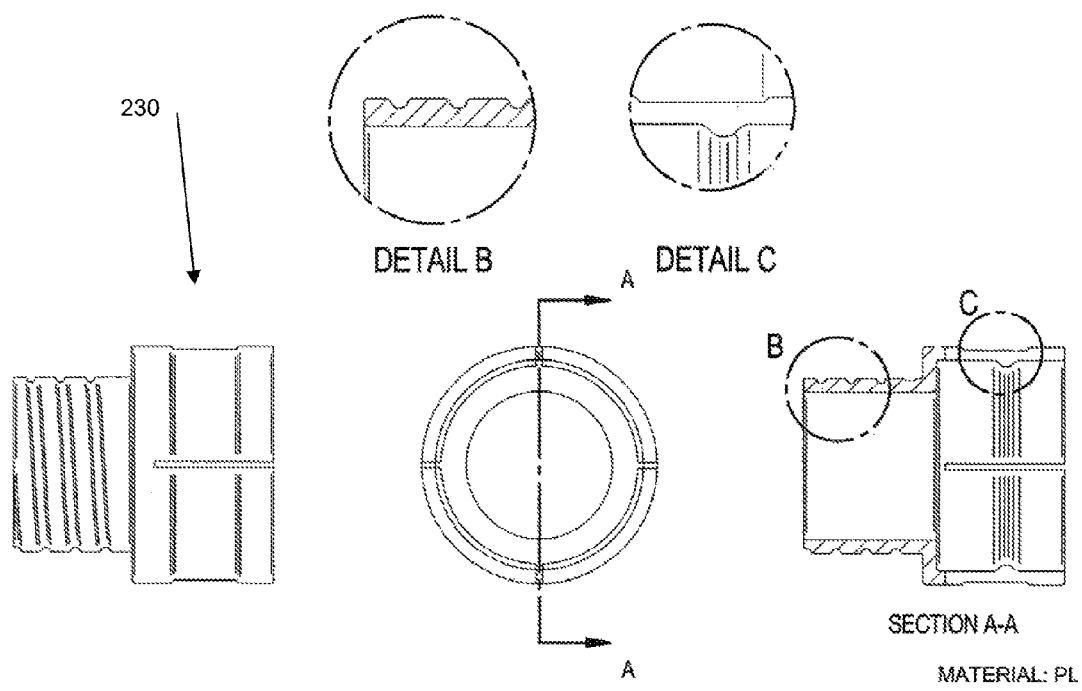
FIG. 16 illustrates front, top, and sectional views of the handle end cap of the exemplary embodiment of the welding gun of the invention.

Handle clamp 170 provides a central structure for the welding gun. Handle clamp 170 is shown in more detail in FIGS. 2 and 3. Successively extending rearward from handle clamp 170 are cable connector block 174 (FIG. 4), power cable male cone 190 (FIGS. 5 and 6), power cable female nut 200 (FIGS. 7 and 8), and conduit 240. These features together provide a continuous path for welding wire and shielding gas to be supplied from the power source to the welding gun.

Cable connector block 174, power cable male cone 190, and power cable female nut 200 are each enclosed within handle 210 (made up of handle halves 211a and 211b), handle cap 220, and handle end cap 230 (FIGS. 9-16). Handle cap 220 is provided for instances when the welding gun needs to communicate with the welding control. Handle end cap 230 is arranged over the two handle halves (211a and 211b) to hold the handle halves together.

The distal end 212 of handle 210 is restrained axially within handle clamp 170 by clamping action provided by fasteners 172. In this exemplary embodiment, distal end 212 of handle 210 is formed in a hexagonal shape, which matches the hexagonal receiving surface 171 in handle clamp 170. These matching shapes facilitate the clamping connection between handle clamp 170 and handle 210, and also prevent the relative rotation of these features. Other shapes that provide these functions may also be used.

Alternatively, the features extending rearward from handle clamp 170 may be arranged in any configuration that provides the functionality described above.

Cable connector block 174a, power cable male cone 190a, power cable female nut 200a, conduit 240a, handle 210a, handle cap 220a and handle end cap 230a are similarly arranged.

Successively extending forward from handle clamp 170 are gooseneck 160, diffuser 150, tip holder 140, diffuser cap 130, contact tip assembly 120, and nozzle 110. These features together provide a continuous path for welding wire and shielding gas to be supplied from the cable connector block 174 to contact tip assembly 120.

Figure 17:
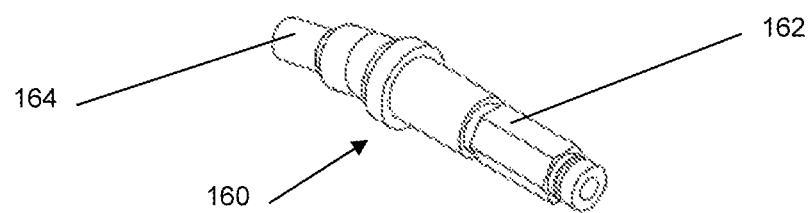
FIG. 17 illustrates an isometric view of a gooseneck assembly of the exemplary embodiment of the welding gun of the invention.
Figure 18:
FIG. 18 illustrates front, rear, side, top and bottom views of the gooseneck of the exemplary embodiment of the welding gun of the invention.
Figure 18:
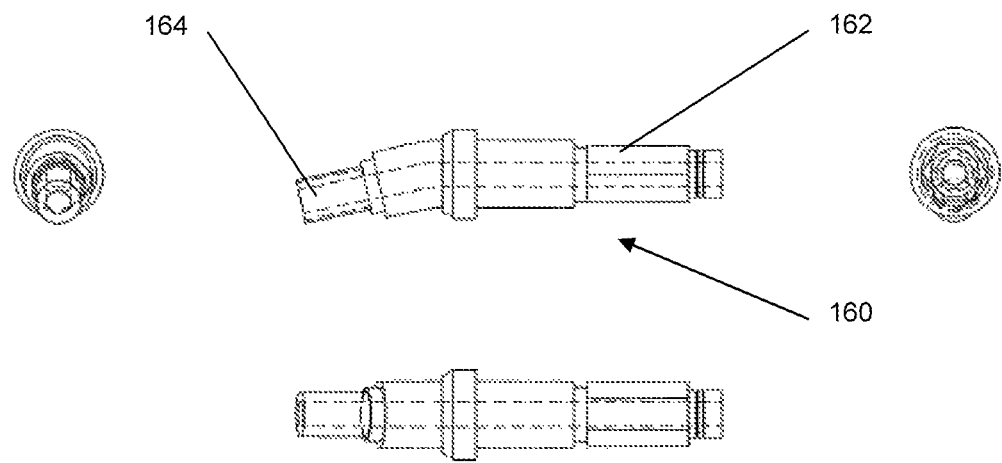

Gooseneck 160 (FIGS. 17 and 18) is a conduit for welding wire and shielding gas to be transported to diffuser 150. The rear end 162 of gooseneck 160 is inserted into receiving surface 176 of cable connector block 174 through opening 212 in handle 210. In this exemplary embodiment, the rear end 162 is formed of a hexagonal shape, which matches the hexagonal shape of receiving surface 176 in cable connector block 174. These matching shapes facilitate the connection between gooseneck 160 and cable connector block 174, facilitate the electrical contact therebetween, and prevent the relative rotation of these features. Other shapes which provide this functionality may also be used. Small fasteners 179 may also be threaded into handle clamp 170 and/or cable connector block 174 to axially restrain gooseneck 160.

Figure 19:
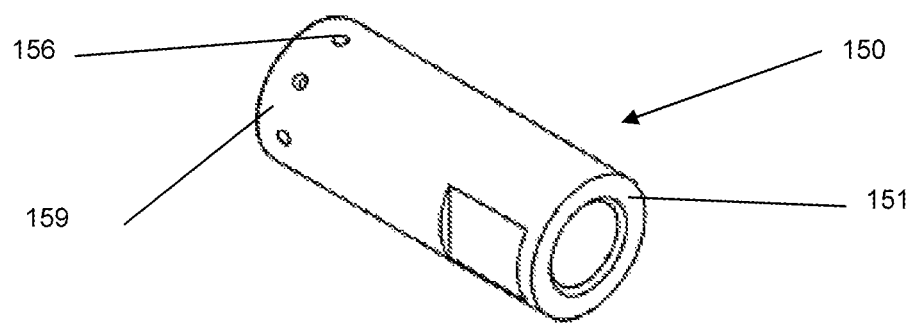
FIG. 19 illustrates an isometric view of a diffuser of the exemplary embodiment of the welding gun of the invention.
Figure 20:
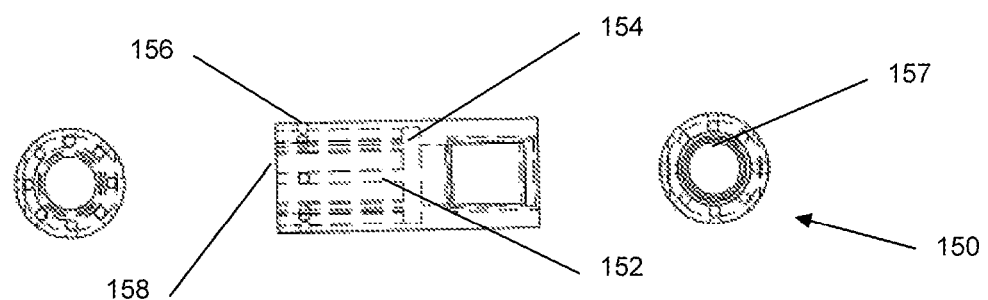
FIG. 20 illustrates front, rear, and side views of the diffuser of the exemplary embodiment of the welding gun of the invention.

Diffuser 150 (FIGS. 19 and 20) is arranged on distal end 164 of gooseneck 160. In this exemplary embodiment, diffuser 150 is threaded on distal end 164. Diffuser 150 includes axial tubes 152 within its casing 151. These axial tubes travel from a groove 154 formed in the casing 151 to the distal end 158 of diffuser 150. In this embodiment, groove 154 is formed distally adjacent to the distal end 164 of gooseneck 160 when diffuser 150 is arranged thereon. Near the distal end 158 of diffuser 150 are also provided radial holes 156 that connect axial tubes 152 with the outer surface 159 of diffuser 150.

Axial tubes 152 are provided to transport shielding gas collected by groove 154 axially within the casing 151 of diffuser 150 before redirecting it out of diffuser 150 through radial holes 156. This axial transport of shielding gas helps to cool the diffuser 150—along with tip holder 140, diffuser cap 130, and contact tip assembly 120—though the principle of heat transfer due to the relative coolness and movement of the shielding gas. This provides cooling effects to diffuser 150, tip holder 140, diffuser cap 130, and contact tip assembly 120, which prolongs their useful lives.

While groove 154 is provided in this embodiment, any groove or baffle feature that redirects shielding gas into axial tubes 152 may be utilized.

Figure 21:
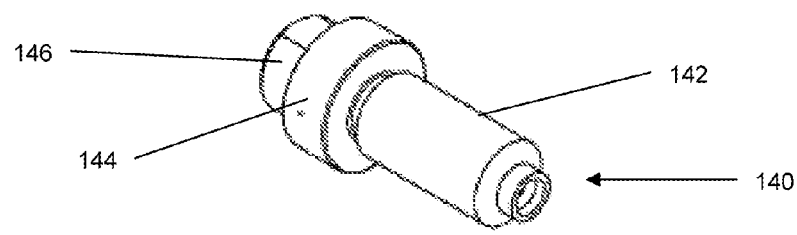
FIG. 21 illustrates an isometric view of a tip holder of the exemplary embodiment of the welding gun of the invention.
Figure 22:
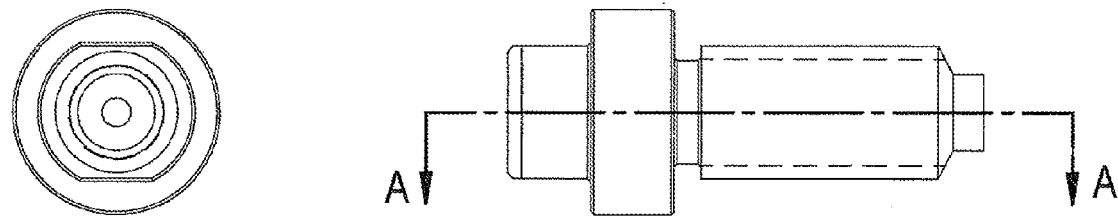
FIG. 22 illustrates front, top, and sectional views of the tip holder of the exemplary embodiment of the welding gun of the invention.
Figure 22:
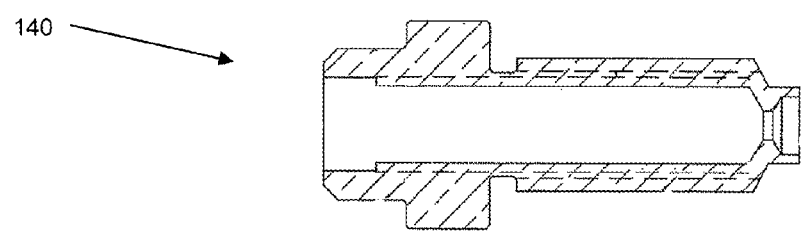

Tip holder 140 (FIGS. 21 and 22) is arranged at the distal end 158 of diffuser 150. Tip holder 140 includes collar 144 which closes the distal ends of the axial tubes 152 of diffuser 150, and proximal end 143, which deflects shielding gas into groove 154 of diffuser 150. In this exemplary embodiment, tip holder 140 includes a long threaded rear portion 142 that is threaded into receiving threads 157 of diffuser 150. Tip holder 140 acts as an interface between diffuser 150 and contact tip assembly 120. Due to the presence of tip holder 140 between diffuser 150 and contact tip assembly 120, the chances of contact tip assembly 120 becoming fused to diffuser 150 due to high heat conditions is eliminated. Additionally, the long threaded rear portion 142 greatly facilitates heat transfer between the contact tip assembly 120, diffuser cap 130, tip holder 140, and diffuser 150, and the release of that heat through the shielding gas flow.

Figure 23:
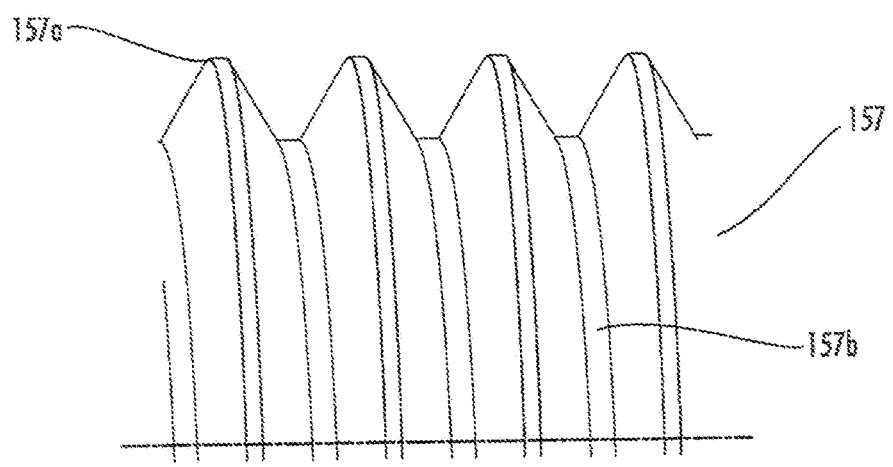
FIG. 23 illustrates the inventive thread shape of the exemplary embodiment of the welding gun of the invention.

Additionally, the threads on long threaded rear portion 142, and/or receiving threads 157, may also utilize a special thread design to provide even more improved heat transfer. This design is shown in more detail in FIG. 23. Specifically, this special thread design incorporates threads that have their peaks 157a, or high points, removed or flattened (such as by machining). The valleys 157b may also be flattened to correspond to opposing peaks. In traditional designs, thread peaks are subject to heat up first, and thus can become fused to mating parts in high heat conditions. The removal of these peaks prevents this fusing. While flattened peaks are shown in this example, other shapes that reduce the high points of the threads may also be used.

Figure 24:
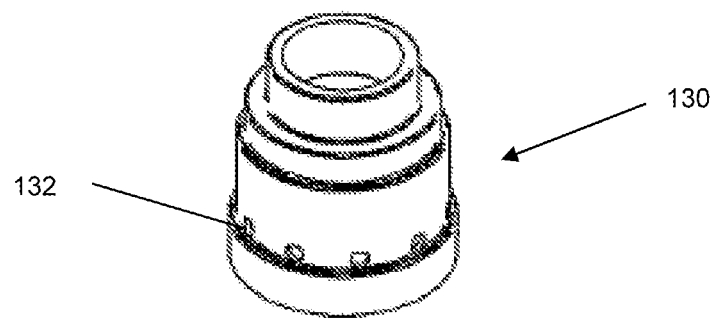
FIG. 24 illustrates an isometric view of a diffuser cap of the exemplary embodiment of the welding gun of the invention.
Figure 25:
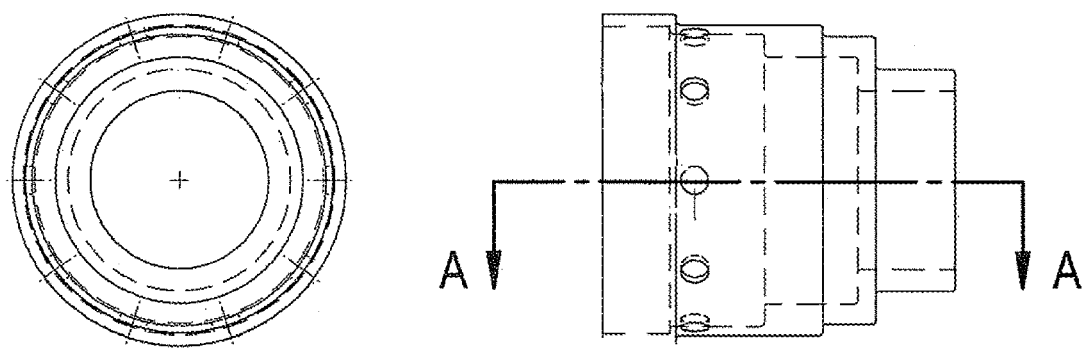
FIG. 25 illustrates front, top, and sectional views of the diffuser cap of the exemplary embodiment of the welding gun of the invention.
Figure 25:
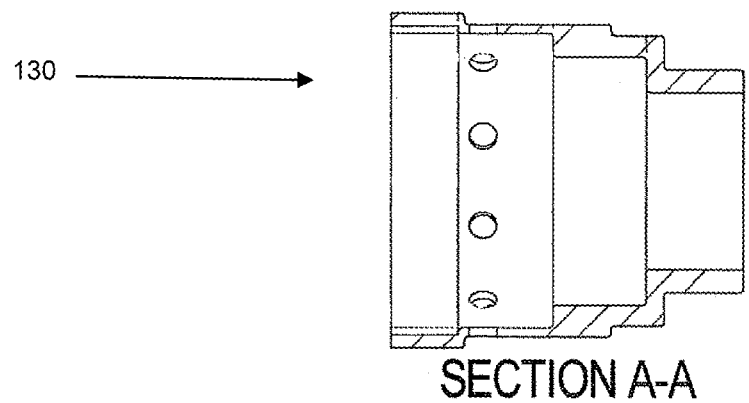

Diffuser cap 130 (FIGS. 24 and 25) is provided at the distal end of tip holder 140, and extends over collar 144 of tip holder 140, and the distal end surface 159 of diffuser 150. Radial holes 132 are provided at the proximal end of diffuser cap 130, and are arranged above radial holes 156 of diffuser 150. Diffuser cap 120 may be retained simply by being sandwiched between tip holder 140 and contact tip assembly 120, or may have its own attachment scheme. Although it is not necessary for radial holes 132 and 156 to align, they may be designed to do so, and diffuser cap 120 may also have an anti-rotation feature which maintains such an alignment. Diffuser cap 120 is a sacrificial part that protects diffuser 150 from spatter.

Figure 26:
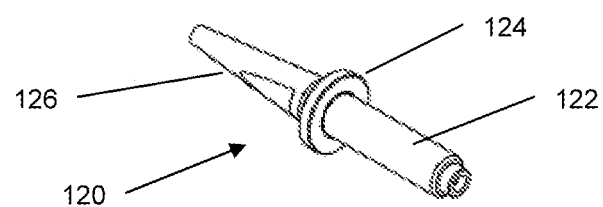
FIG. 26 illustrates an isometric view of a contact tip assembly of the exemplary embodiment of the welding gun of the invention.
Figure 27:
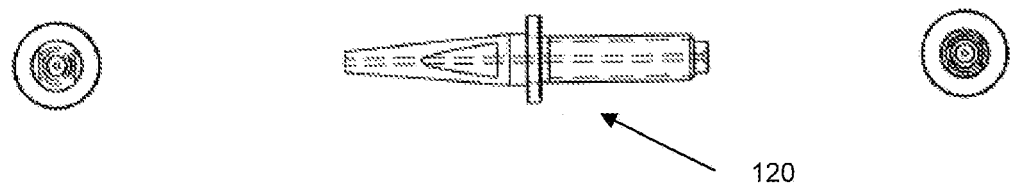
FIG. 27 illustrates front, rear and top views of the contact tip assembly of the exemplary embodiment of the welding gun of the invention.

Contact tip assembly 120 (FIGS. 26 and 27) is provided at the distal end of tip holder 140 and diffuser cap 130. In this embodiment, contact tip assembly 120 has a long threaded portion 122 that threads into tip receiving threads 148 of tip holder 140. Long threaded portion 122 is of sufficient length to extend far into both the tip holder 140 and diffuser 150, thereby facilitating heat transfer from contact tip assembly through tip holder 140 and diffuser 150 to the shielding gas flowing through axial tubes 152 and out through the diffusing shielding gas. The long threaded portion 122 may extend by any length into the tip holder 140, and may have a length coextensive therewith.

The threads on the long threaded portion 122 of contact tip 120, and/or the receiving threads 148 of tip holder 141, may also utilize the special thread feature discussed above (i.e., the threads may have their peaks removed).

Figure 28:
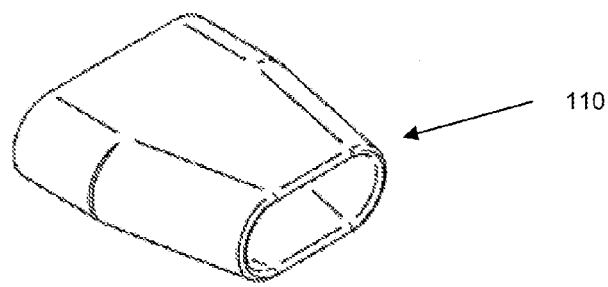
FIG. 28 illustrates an isometric view of a nozzle of the exemplary embodiment of the welding gun of the invention.
Figure 29:
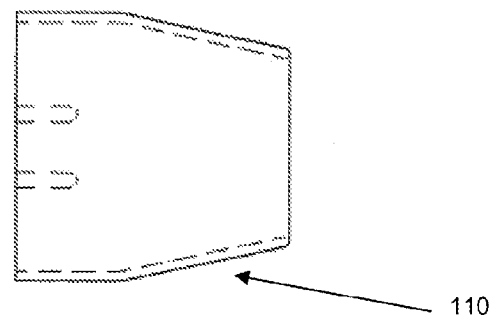
FIG. 29 illustrates front, rear, side, and top views of the nozzle of the exemplary embodiment of the welding gun of the invention.
Figure 29:
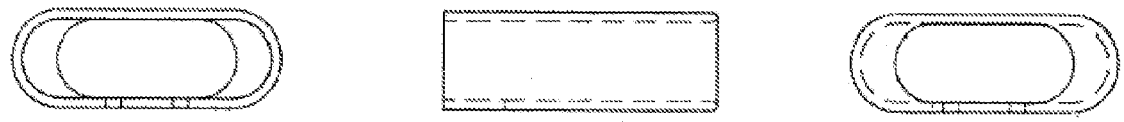
Figure 30:
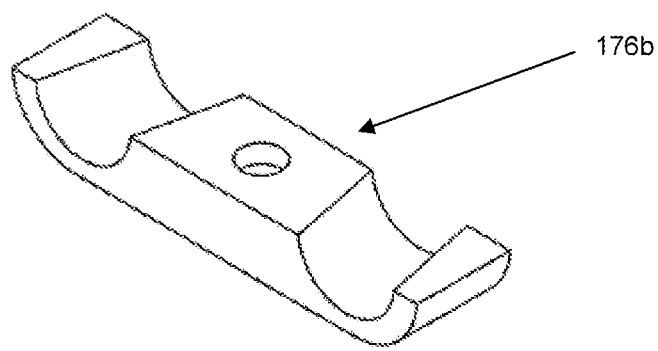
FIG. 30 illustrates an isometric view of an upper gooseneck clamp of the exemplary embodiment of the welding gun of the invention.
Figure 31:
FIG. 31 illustrates front, side, and top views of the upper gooseneck clamp of the exemplary embodiment of the welding gun of the invention.
Figure 31:
Figure 31:
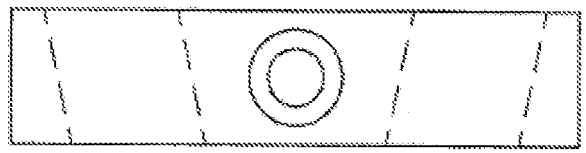
Figure 32:
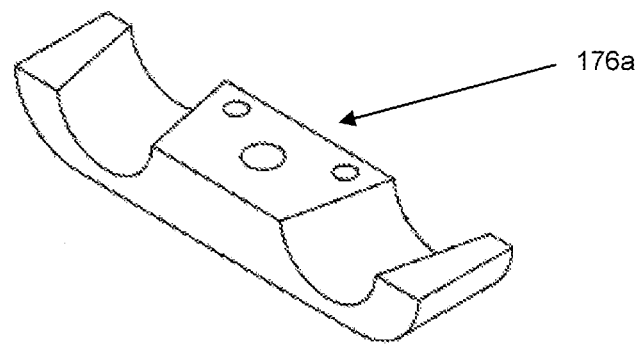
FIG. 32 illustrates an isometric view of a lower gooseneck clamp of the exemplary embodiment of the welding gun of the invention.
Figure 33:
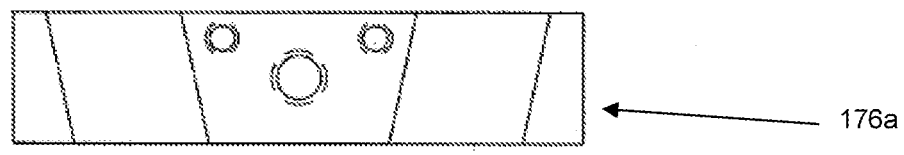
FIG. 33 illustrates front, side, and top views of the lower gooseneck clamp of the exemplary embodiment of the welding gun of the invention.
Figure 33:

Nozzle 110 (FIGS. 28 and 29) surrounds gooseneck 160, diffuser 150, tip holder 140, diffuser cap 130, contact tip assembly 120, and directs the shielding gas diffused from radial holes 156 of diffuser 150 about contact tip 120 to form a protective layer between the molten metal of the welding operation and the surrounding atmosphere.

Gooseneck 160a, diffuser 150a, tip holder 140a, diffuser cap 130a, contact tip assembly 120a, and nozzle 110a are similarly arranged.

Gooseneck clamp 176 (FIGS. 30-33) supports and aligns goosenecks 160 and 160a to each other, and is made of an upper gooseneck clamp 176a and a lower gooseneck clamp 176b, which are mated together via fasteners.

Rod 180 provides a positive adjustable stop to ensure the nozzle is adjusted to the proper axial location.

Figure 34:
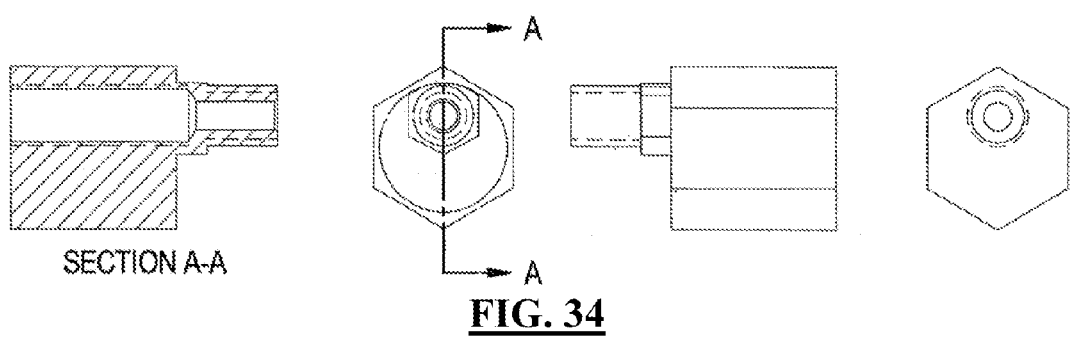
FIG. 34 illustrates front, side, rear and sectional views of a rear cable connector block of the exemplary embodiment of the welding gun of the invention.
Figure 35:
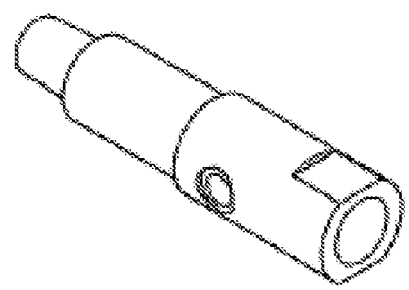
FIG. 35 illustrates an isometric view of a gun connector of the exemplary embodiment of the welding gun of the invention.
Figure 36:
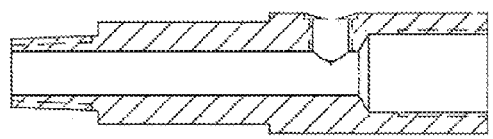
FIG. 36 illustrates top and sectional views of the gun connector of the exemplary embodiment of the welding gun of the invention.
Figure 36:
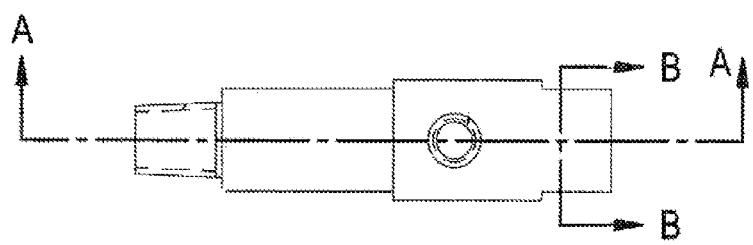
Figure 36:
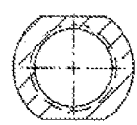

The welding gun 100 may be connected to a welding power source by a rear cable connector and gun connector, such as shown in FIGS. 34-36.

The welding gun described in the above exemplary embodiment can be employed for hand-held welding, robotic welding and hard automation.

The welding gun described in the above exemplary embodiment employs air cooling. But, the invention is equally applicable to water cooled systems, as a water cooling means may be added to the disclosed welding gun and used in conjunction with the heat transfer characteristics provided by the axial tubes 152 in diffuser 150. Such a configuration would provide even further improved cooling for the welding gun.

The welding gun described in the above exemplary embodiment employs fasteners is some instances. These fasteners can be any of screws, bolts, clamps, snap-fasteners, lock-fits, or any other type of fastener that provides similar functionality.

The welding gun described in the above exemplary embodiment employs threaded fastening between components. However, alternative methods of fastening might also be used, such as slotting, clamping, snap-fitting, or any other method that provides similar functionality.

The welding gun described in the above exemplary embodiment employs anti-rotation features between components, such as the illustrated hexagonal shapes. But, any shape that prevents rotation may be used, such as a triangle, square, pentagon, etc. Alternatively, any other anti-rotation features, such as fins and slots, may be used.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:
1. A welding gun comprising:
   a shielding gas diffuser, the shielding gas diffuser comprising, a casing having an outer surface and an inner surface disposed about a central axis, the inner surface comprising threads at at least one of a proximal end and a distal end of the casing, the threads of the inner surface of the casing comprising peaks with reduced high points, at least one axial tube extending axially within the casing, the inner surface including a directing feature to direct shielding gas within the casing into the at least one axial tube, and at least one radial hole formed in the outer surface of the casing, each at least one radial hole respectively extending to the at least one axial tube to transport the shielding gas out of the gas diffuser.

2. The welding gun of claim 1, wherein the directing feature comprises a groove formed in the inner surface of the casing, and connected to a proximal end of the at least one axial tube.

3. The welding gun of claim 1, wherein the high points of the peaks are reduced by flattening the peaks.

4. The welding gun of claim 3, wherein at least one of the proximal end threads and the distal end threads of the inner surface of the casing comprise valleys that are flattened.

5. The welding gun of claim 1, further comprising:
a gooseneck,
wherein the inner surface of the casing comprises threads at the proximal end, and
wherein an outer surface of a distal end of the gooseneck comprises threads configured to thread onto the proximal end threads of the inner surface of the casing, the distal end gooseneck threads comprising valleys corresponding to the reduced high points of the proximal end threads of the inner surface of the casing.

6. The welding gun of claim 5, wherein the high points of the peaks of the proximal end threads of the inner surface of the casing are reduced by flattening the peaks, and
wherein the valleys of the distal end gooseneck threads are flattened.

7. The welding gun recited in claim 2, further comprising:
a gooseneck; and
a tip holder,
wherein the inner surface of the casing comprises threads at the proximal end and at the distal end, and
wherein an outer surface of a distal end of the gooseneck comprises threads configured to thread onto the proximal end threads of the inner surface of the casing, the distal end gooseneck threads comprising valleys corresponding to the reduced high points of the proximal end threads of the inner surface of the casing,
wherein an outer surface of a proximal end of the tip holder comprises threads configured to thread onto the distal end threads of the inner surface of the casing, the proximal end tip holder threads comprising valleys corresponding to the reduced high points of the distal end threads of the inner surface of the casing, and
wherein the proximal end of the tip holder extends into the diffuser to a point distally adjacent to the groove.

8. The welding gun of claim 7, wherein the high points of the peaks of the distal end threads and the proximal end threads of the inner surface of the casing are reduced by flattening the peaks, and
wherein the valleys of the proximal end tip holder threads and the valleys of the distal end gooseneck threads are flattened.

9. The welding gun recited in claim 7, wherein a distal end of the at ea one axial tube opens to the distal end of the casing.

10. The welding gun recited in claim 9, wherein the tip holder comprises a collar that closes the distal end of the at least one axial tube to redirect the shielding gas collected in the at least one axial tube to the corresponding at least one radial hole and out of the diffuser.

11. The welding gun recited in claim 7, further comprising a contact tip assembly, wherein a radially inner surface of the tip holder and a radially outer surface of a proximal end of the contact tip assembly are connected via a connection system.

12. The welding gun recited in claim 11, wherein the connection system comprises threads that comprise peaks with reduced high points on at least one of the contact tip assembly and tip holder, and wherein the high points of the peaks on at least one of the contact tip assembly and tip holder are reduced by flattening the peaks.

13. A welding gun comprising:
a shielding gas diffuser, the shielding gas diffuser comprising,
a casing having an outer surface and an inner surface disposed about a central axis, the inner surface comprising threads, where the threads are at at least one of a proximal end and a distal end of the casing, the threads having peaks where the peaks have a flattened surface,
at least one axial tube extending axially within the casing, the inner surface including a directing feature to direct shielding gas within the casing into the at least one axial tube, and
at least one radial hole formed in the outer surface of the casing, each at least one radial hole respectively extending to the at least one axial tube to transport the shielding gas out of the gas diffuser.

14. A welding gun comprising:
a shielding gas diffuser, the shielding gas diffuser comprising,
a casing having an outer surface and an inner surface disposed about a central axis, the inner surface comprising threads at at least one of a proximal end and a distal end of the casing, the threads having reduced high points such that the high points have a flattened surface,
at least one axial tube extending axially within the casing, the inner surface including a directing feature to direct shielding gas within the casing into the at least one axial tube, and
at least one radial hole formed in the outer surface of the casing, each at least one radial hole respectively extending to the at least one axial tube to transport the shielding gas out of the gas diffuser.

15. A welding gun comprising:
a shielding gas diffuser, the shielding gas diffuser comprising,
a casing having an outer surface and an inner surface disposed about a central axis, where the casing has both of a proximal end and a distal end and where the inner surface comprises threads at at least one of a proximal end and a distal end of the casing, where each of the threads has a flattened surface where each of the flattened surfaces is oriented the same as a centerline of the casing,
at least one axial tube extending axially within the casing, the inner surface including a directing feature to direct shielding gas within the casing into the at least one axial tube, and
least one radial hole formed in the outer surface of the casing, each at least radial hole respectively extending to the at least one axial tube to transport the shielding gas out of the gas diffuser.

16. A welding gun comprising:
a shielding gas diffuser, the shielding gas diffuser comprising,
  a casing having an outer surface and an inner surface disposed about a central axis, the inner surface comprising threads, where the threads are at at least one of a proximal end and a distal end of the casing, the threads having peaks and valleys where each of the peaks and the valleys have a flattened surface,
  at least one axial tube extending axially within the casing, the inner surface including a directing feature to direct shielding gas within the casing into the at least one axial tube, and
  at least one radial hole formed in the outer surface of the casing, each at least one radial hole respectively extending to the at least one axial tube to transport the shielding gas out of the gas diffuser.

17. A welding gun comprising:
a shielding gas diffuser, the shielding gas diffuser comprising,
  a casing having an outer surface and an inner surface disposed about a central axis, the inner surface comprising threads, where the threads are at at least one of a proximal end and a distal end of the casing, the threads having peaks where the peaks have a flattened surface,
  at least one axial tube extending axially within the casing, the inner surface including a groove to direct shielding gas within the casing into the at least one axial tube, the groove connected to a proximal end of the at least one axial tube.

18. A welding gun comprising:
a shielding gas diffuser, the shielding gas diffuser comprising,
  a casing having an outer surface and an inner surface disposed about a central axis, the inner surface comprising threads at at least one of a proximal end and a distal end of the casing, the threads having reduced high points such that the high points have a flattened surface,
  at least one axial tube extending axially within the casing, the inner surface including a groove to direct shielding gas within the casing into the at least one axial tube, the groove connected to a proximal end of the at least one axial tube.

19. A welding gun comprising:
a shielding gas diffuser, the shielding gas diffuser comprising,
  a casing having an outer surface and an inner surface disposed about a central axis, where the casing has both of a proximal end and a distal end and where the inner surface comprises threads at at least one of a proximal end and a distal end of the casing, where each of the threads has a flattened surface where each of the flattened surfaces is oriented the same as a centerline of the casing,
  at least one axial tube extending axially within the casing, the inner surface including a groove to direct shielding gas within the casing into the at least one axial tube, the groove connected to a proximal end of the at least one axial tube.

20. A welding gun comprising:
a shielding gas diffuser, the shielding gas diffuser comprising,
  a casing having an outer surface and an inner surface disposed about a central axis, the inner surface comprising threads, where the threads are at at least one of a proximal end and a distal end of the casing, the threads having peaks and valleys where each of the peaks and the valleys have a flattened surface,
  at least one axial tube extending axially within the casing, the inner surface including a groove to direct shielding gas within the casing into the at least one axial tube, the groove connected to a proximal end of the at least one axial tube.

* * * * *